United States Patent [19]

Tagaya et al.

[11] Patent Number: 4,781,904
[45] Date of Patent: Nov. 1, 1988

[54] CALCIUM-PHOSPHATE TYPE HYDROXYAPATITE FOR CHROMATOGRAPHIC SEPARATION AND PROCESS FOR PRODUCING SAME

[75] Inventors: Nobuaki Tagaya, Kawagoe; Hideyuki Kuwahara, Oi; Takao Hashimoto, Oi; Noriko Komatsu, Oi; Keiko Fukamachi, Mitaka; Tsugio Maeshima, Saitama; Toshihiro Ishikawa; Tetsuro Ogawa, both of Tokyo, all of Japan

[73] Assignees: Tao Nenryo Kogyo Kabushiki Kaisha; Asahi Kogaku Kogyo Kabushiki Kaisha, both of Tokyo, Japan

[21] Appl. No.: 909,978

[22] Filed: Sep. 22, 1986

[30] Foreign Application Priority Data

Sep. 23, 1985 [JP] Japan .................... 60-209562

[51] Int. Cl.4 .............................. C01B 25/32
[52] U.S. Cl. ....................... 423/308; 423/309; 423/311; 530/344; 530/412; 530/416; 530/417
[58] Field of Search ............. 423/308, 309, 311; 530/344, 412, 416, 417

[56] References Cited

U.S. PATENT DOCUMENTS 4,497,075 2/1985 Niwa et al. .................... 423/308

Primary Examiner—John Doll
Assistant Examiner—Wayne A. Langel
Attorney, Agent, or Firm—Seidel, Gonda, Lavorgna & Monaco

[57] ABSTRACT

A calcium-phosphate type hydroxyapatite for chromatographic separation is in the form of spherulites having a mean particle diameter of 0.5 to 50 μm, preferably 1 to 10 μm. The spherulites are each an aggregate mainly of acicular crystallites belonging to a series of hexagonal systems and having unit lattice constants of 9.58±0.08 Å for the a axis and 7.00±0.05 Å for the c axis. The hydroxyapatite is produced by granulating a calcium-phosphate type hydroxyapatite in the form of a gel and then firing the granular apatite at 400° to 700° C., preferably at 500° to 600° C. The firing is performed by heating the granules in the presence of oxygen or air for a given period of time.

6 Claims, 3 Drawing Sheets

CALCIUM-PHOSPHATE TYPE HYDROXYAPATITE FOR CHROMATOGRAPHIC SEPARATION AND PROCESS FOR PRODUCING SAME

BACKGROUND OF THE INVENTION

This invention relates to a calcium-phosphate type hydroxyapatite for chromatographic separation and a process for producing the same.

More particularly, the invention is concerned with a novel calcium-phosphate type hydroxyapatite having specific crystal properties and useful as a column packing material for separation of biopolymers.

The term apatite-structure compounds is generically used to denote a large group of compounds having a common formula $M_{10}(ZO_4)_6 \cdot X_2$ where M represents a metallic atom of Ca, Ba, Sn, Mg, Na, K, Pb, Cd, Zn, Ni, Fe, Al or the like, $ZO_4$ represents an acid radical, such as $PO_4$, $AsO_4$, $VO_4$, or $SiO_4$, and X represents an OH or F atom (group). The present invention is directed to a calcium phosphate compound of the above general formula in which M is essentially Ca, $ZO_4$ essentially $PO_4$, and X essentially OH.

The calcium-phosphate type hydroxyapatite, $Ca_{10}(PO_4)_6(OH)_2$ (hereinafter termed "hydroxyapatite" unless otherwise noted), has attracted growing attraction in recent years as a material for biomedical use, typically for artificial teeth and bones. This is because it closely resembles in composition to the inorganic ingredients of the teeth and bones of vertebrate animals and exhibits good affinity for living bodies. The affinity for living organisms has rendered it useful as a packing material to be filled in columns for chromatographic separation of biopolymers, for example, proteins, enzymes, and nucleic acids.

Conventionally, such hydroxyapatites are synthesized in most cases by (1) wet synthesis involving an aqueous solution reaction in which a water-soluble calcium salt and phosphate are allowed to react in aqueous solution.

(2) dry synthesis involving a high-temperature solid-phase reaction in which calcium phosphate and calcium carbonate are allowed to react in the presence of water vapor at 900° to 1400° C., or (3) hydrothermal synthesis involving a reaction under high-temperature, high-pressure steam in which calcium hydrogen-phosphate is hydrolyzed, for example, at 200° C. and at 15 atm.

In addition to these, a new synthetic process has been proposed, for example, by Patent Application Publication No. 500447/1980.

The hydroxyapatites obtained in the foregoing processes have been in the form of plates which have to be finely divided particularly when used as column packing material for chromatographic separation.

The plates are thus divided into tiny pieces varied in shape and size. The irregular pieces of hydroxyapatite cannot be packed uniformly or densely in the column for chromatographic separation. The packing material so obtained can hardly be considered satisfactory in performance, both in separability and selectivity.

In an effort to overcome the difficulties of the conventional hydroxyapatites as column packing materials for chromatographic separation, we have made extensive studies and experiments. As a result, it has now been found that, when such a hydroxyapatite is employed as a packing material for chromatographic separation, the size and shape of the finely divided product constitute very important factors and that, in particular, the shape should be spherical and the size distribution be within a narrow range, and further that the hydroxyapatite in the form of spherulites having a mean particle diameter of 0.5 to 50 μm, preferably 1 to 10 μm, achieves adequate separability and selectivity.

The present invention is based upon these newly found facts.

Therefore, the object of the invention is, in view of the fact that the hydroxyapatites proposed thus far have had inadequate separability and selectivity when used as column packing materials for chromatographic separation of bipolymers, to provide a novel calcium-phosphate type apatite for chromatographic separation having unique shape and size and excels in separability and selectivity.

SUMMARY OF THE INVENTION

Briefly, this invention provides a calcium-phosphate type apatite for chromatographic separation taking the form of spherulites having a mean particle diameter of 0.5 to 50 μm, preferably 1 to 10 μm.

Such a hydroxyapatite can be satisfactorily produced by granulating a calcium-phosphate type hydroxyapatite in the form of a gel and then firing the granular apatite at a temperature in the range of 400° to 700° C.

DETAILED DESCRIPTION OF THE INVENTION

Figure 1:
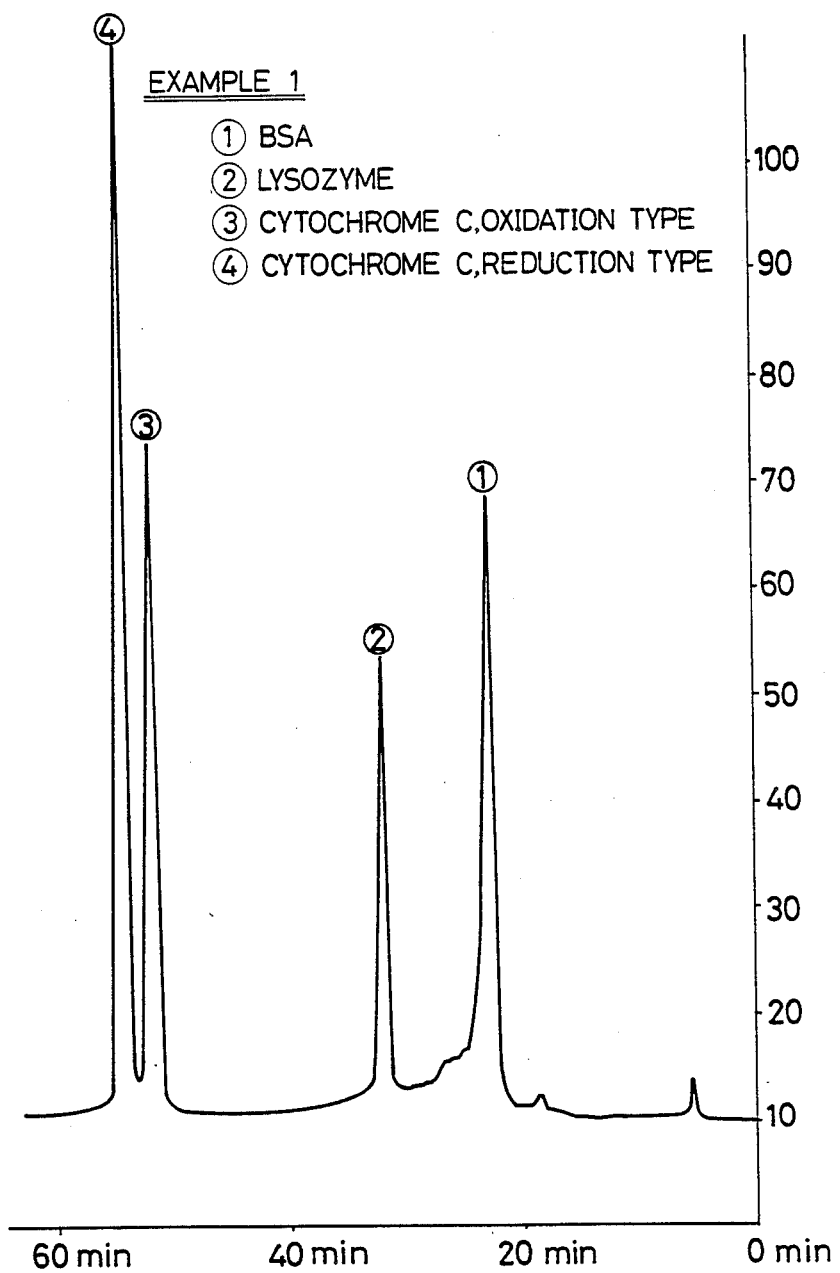
FIGS. 1 to 3 are liquid chromatograms indicating that hydroxyapatites prepared in accordance with the invention are remarkably improved in separability over hydroxyapatites known in the art.

The present invention resides in a calcium-phosphate type hydroxyapatite for chromatographic separation in the form of spherulites having a mean particle diameter of 0.5 to 50 μm, preferably 1 to 10 μm. Our further research has now revealed that a hydroxyapatite having crystal properties such that the crystal structure belongs to a series of hexagonal systems, with a space group of $P6_3/m$ and unit lattice constants of 9.58±0.08 Å for the a axis and 7.00±0.05 Å for the c axis, is capable of constantly achieving adequate separability and selectivity when used as a column packing material for chromatographic separation, especially of biopolymers.

The hydroxyapatite having the desirable, unique crystal properties will now be described in detail below.

As used herein, the term "unit lattice" means a unit cell as a minimum repeating unit of crystal in which atoms, atomic groups, and molecules are regularly arranged in three-dimensional space. The geometric symmetry of the unit cells is denoted by the crystal system and space group, and the size of the unit cells by the lattice constants. The unit cell of apatite-structure compounds is represented by a hexagonal lattice, for example, with a $Ca^{2+}$, $PO_4^{3-}$, or $OH^-$ arrangement therein.

The unit lattice constants of the already disclosed apatite-structure compounds, for example, of the calcium-phosphate type hydroxyapatite, are 9.432 Å for the a axis and 6.881 Å for the c axis.

The hydroxyapatite as a preferred embodiment of the present invention, by contrast, has unit lattice constants of 9.58±0.08 Å for the a axis and 7.00±0.05 Å for the c axis. Thus, the hydroxyapatite of the structure according to the invention is utterly dissimilar in crystal properties from those of the prior art and is a novel one not known in the art yet.

The unit lattice constants can be determined by the X-ray diffraction technique. To be more concrete, the angles of diffraction (Bragg angles) according to the powder X-ray diffraction are measured. The diffraction angles can be obtained from the X-ray diffraction pattern recorded on a chart by an X-ray diffraction apparatus equipped with a diffractometer (using CuKα X-rays). Also, from the Bragg equation $\lambda = 2a\sin\theta$ where $\lambda$ is the wavelength of the CuKα rays, 1.54184 Å) the lattice spacings in angstroms, d (Å), can be found. The crystal system of the hydroxyapatite is hexagonal, and Miller indices (hkl) are given for each lattice spacing d (Å), as set forth in the powder X-ray diffraction file, JCPDS (Joint Committee on Powder Diffraction Standard) 9-432. The lattice spacing d (Å) is expressed, from the lattice constants a and c and from Miller indices (hkl), as formulated below:

$$d = \frac{1}{\sqrt{(4/3a^2)(h^2 + k^2 + hk) + (l^2/C^2)}}$$

Using the Bragg equation, it is written as:

$$\sin^2\theta = \frac{1}{3}\left(\frac{\lambda}{a}\right)^2 (h^2 + k^2 + hk) + \left(\frac{\lambda}{2C}\right)^2 l^2$$

The unit lattice constants a and b of the hydroxyapatite as a preferred embodiment of the invention are found from the theoretical formula of the hexagonal system using the Bragg angles of the individual diffracted lines obtained by the X-ray diffractometry and the known Miller indices. The most probable values and error ranges of the unit lattice constants a and c are determined by the method of least squares. Table 1 shows the lattice spacings, d (Å), obtained by the X-ray diffraction of the hydroxyapatite of the invention.

The hydroxyapatite as a preferred embodiment of the invention having the unit lattice constants of $9.58 \pm 0.08$ Å for the a axis and $7.00 \pm 0.05$ Å for the c axis exhibits particularly advantageous performance in the separation of biopolymers, for example, of proteins. When the unit lattice constants of the apatite are not within the ranges specified above, the separation performance is seriously low.

The grounds on which the hydroxyapatite of the invention having the unit lattice constants (a and c) within the specific ranges functions advantageously in the separation of biopolymers in particular are yet to be clarified. However, it may well be said that, ordinarily in the separation of a bipolymer, for example, of a nucleic acid such as DNA or of a protein, an important role is played by the interactions between the adsorption points (adsorption sites) present in the hydroxyapatite substrate and the phosphoryl groups on the molecules of the nucleic acid or between the adsorption points and the amino and carboxyl groups of the protein.

It is to be noted here that on the surface of the hydroxy-apatite there appear mainly two different planes; one parallel to the plane ac or bc of the crystal lattice (and called the plane b or a, respectively) which are equivalent crystallographically, and a plane parallel to the plane ab (and called the plane c). On the plane a or b of the crystal are arranged adsorption points (called the adsorption points c) each constituted by two positively charged calcium atoms, and on the plane c of the crystal, adsorption points (called the points P) each constituted by six oxygen atoms derived from negatively charged phosphoryl ions. Located in the crystal, these points are arranged regularly and exist in a constant number per unit area. It follows that where the unit lattice constants a and c (values) are different, the distances between the adsorption points c and between the adsorption points P differ too.

As noted above, for the chromatographic separation of biopolymers the interactions between the adsorption points of the hydroxyapatite and the various functional groups of the biopolymers are important, and it is obvious that the distances between the adsorption points c and between the points P, or between those adsorption points influence the interactions such as adsorption or desorption of the biopolymers. Appropriate distances must be provided between these adsorption points. It is presumed that the hydroxyapatite having the unit lattice constants conforming to the present invention satisfies the foregoing conditions and performs excellently in the biopolymer separation.

The hydroxyapatite as a preferred embodiment of the invention having such unique crystal properties is desired to have such composition that the atomic ratio of Ca to P, or Ca/P, ranges from 1.5 to 1.9.

The hydroxyapatite of the invention useful as a column packing material for chromatographic separation exhibits a specific pyridine adsorption, in addition to the specific unit lattice constants as defined above. Our investigations have revealed that a hydroxyapatite capable of adsorbing 0.003 to 0.01 mmol of pyridine per gram performs excellently in the separation of biopolymers. This is presumably ascribable to the control of the acid amount, particularly of the functional group $OH^-$, among the functional groups $OH^-$, $Ca^{2+}$, and $PO_4^{3-}$ that play vital roles in the interactions between the hydroxyapatite substrate and the phosphoryl groups on the nucleic acid or between the substrate and the amino and carboxyl groups of the protein as described above.

The pyridine adsorption is expressed principally in terms of the solid acid amount based on the above-mentioned functional groups. If the pyridine adsorption is less than 0.003 mmol/g, the hydroxyapatite has a too low protein separation capability for practical service. If the pyridine adsorption exceeds 0.01 mmol/g, the separation performance is again inadequate.

The hydroxyapatite as a preferred embodiment of the invention takes the form of a crystallite aggregate consisting chiefly of tiny acicular crystals. The dimensions are 100 to 500 Å wide and 500 to 3000 Å long. The acicular crystallites are easy to granulate into spherulites in accordance with the invention, which are crystallite aggregates having a mean particle diameter of 0.5 to 50 μm, preferably 1 to 10 μm. The granulation into spherulites brings with it the advantages of added mechanical strength and more uniform packing of the bed inside the separation column.

Examples of the proteins capable of being separated by chromatography are immunoglobulin G, transferrin, myeloma immunoglobulin D, serum albumin, and ovalbumin.

The process for producing the hydroxyapatite in accordance with the present invention will now be described.

The process of the invention may be carried out by firing the hydroxyapatite in the form of a gel or powder, obtained by the usual wet process involving a solution reaction, dry process involving a high-temperature, solid-phase reaction, or hydrothermal process involving hydrolysis as briefly outlined above, at a temperature of 400° to 700° C. Preferably, the process of the invention comprises granulating the hydroxyapatite in the form of a gel and then firing the granular hydroxyapatite at 400° to 700° C.

We have extensively studied about the relationship between the crystal properties of apatite-structure compounds and the firing temperatures. As a result, it has been found that the unit lattice constants of the apatite-structure compounds increase with the rise of the firing temperature, to a maximum at a point short of about 600° C. and then turn for decreases with the further rise of the temperature beyond that point. The present invention is predicated upon this discovery.

The expression "the hydroxyapatite in the form of a gel" as used herein means a suspension or slurry in which acicular crystallites of hydroxyapatite are suspended or slurried with water or an aqueous solution containing the ions of calcium, phosphoric acid or the like. It can be prepared by any of the afore-described processes for hydroxyapatite synthesis. Also, a hydroxyapatite in the form of a gel may be obtained by dispersing or mixing powdered crystallites in an aqueous solution.

A desirable method of granulating the gel of hydroxyapatite is by spray drying. The spray drying consists of spraying a hydroxyapatite suspension or slurry into a high-temperature air stream and thereby drying it up instantaneously. As for the conditions for spray drying, the suspension or slurry concentration is 0.1 to 20% by weight, preferably 1 to 10% by weight, and the temperature of the high-temperature air stream is 100° to 200° C., preferably 110° to 170° C. The spray nozzle configurations, air quantity, and other conditions may be suitably chosen as desired. Experiments showed that the granulation yielded products with particle diameters controlled within the range of about 0.5 to about 50 $\mu$m, more particularly within the range of about 1 to about 20 $\mu$m. It was found possible that judicious granulation could afford spherulites with diameters in an even narrower range of about 1 to about 10 $\mu$m.

In the process of the invention, the firing is carried out by heating a hydroxyapatite in the form of a gel or powder in a heating zone to a predetermined temperature and then maintaining the same temperature level. The firing temperature is in the range of 400° to 700° C., preferably in the range of 500° to 600° C. The firing time is not critical but is usually 0.1 to 20 hours, preferably 1 to 3 hours. Desirably, the firing is carried out in the presence of oxygen or air. The drying conditions are not specially limited but heating at 80° to 120° C. for 0.1 to 10 hours usually gives good result.

The hydroxyapatite thus obtained by firing the starting apatite in the form of a gel in the manner described in a compound unknown in the art, novel with specific unit lattice constants and properties as follows:

Particle diameter, in $\mu$m: 0.5–50
Ca/P ratio: 1.5–1.9
Particle shape: spherical (acicular-crystallite aggregates)
Pyridine adsorption, in mmol/g: 0.003–0.01

Next, the present invention is illustrated by the following examples.

EXAMPLE 1

A one-liter, three-necked flask was charged with a suspension of calcium hydroxide (consisting of 15.6 g 95% Ca(OH)$_2$ and 400 g distilled water). With the injection of nitrogen gas and with vigorous stirring, an aqueous solution of phosphoric acid (consisting of 13.8 g 85% H$_3$PO$_4$ and 400 g distilled water) was slowly added. Following the conclusion of the addition, the pH was adjusted to 8.2 by the further addition of the aqueous phosphoric acid. The mixture was set in position on an oil bath and held at 90° C. for about 18 hours. A white crystallite-containing product, or a hydroxyapatite in the form of a gel, was obtained.

After cooling, part of the product was passed through a spray drier to obtain spherical granules, or crystallite aggregates, about 1 to about 10 $\mu$m in diameter.

The product was further subjected to drying at 100° C. and firing at 580° C. to prepare granules for separation columns. The lattice spacings found by X-ray diffraction of the granules are given in Table 1. The property values of the granules were as follows:

(1) Unit lattice constants determined by X-ray diffraction:
a = 9.58 Å
c = 7.01 Å
(2) Pyridine adsorption = 0.0056 mmol/g
(3) Ca/P ratio = 1.67

X-ray diffraction was carried out using the apparatus manufactured by Rigaku Denki Co., Model "RAD-rD". The measurement conditions employed were as follows:
Output = 40 kV, 30 mA CuK$\alpha$
DS/RS/SS = 1/6° C./0.15 mm/1/6° C.
Preset time = 0.1 sec.
Step width = 1/100

TABLE 1

| Miller indices | Lattice spacing d (Å) | | |
|---|---|---|---|
| h · k · l | Ex. 1 | Ex. 2 | Ex. 3 |
| 002 | 3.503 | 3.480 | 3.495 |
| 102 | 3.227 | 3.206 | 3.219 |
| 210 | 3.137 | 3.113 | 3.126 |
| 211 | 2.863 | 2.842 | 2.854 |
| 112 | 2.828 | 2.808 | 2.820 |
| 300 | 2.767 | 2.745 | 2.757 |
| 202 | 2.677 | 2.658 | 2.669 |
| 301 | 2.573 | 2.554 | 2.565 |
| 212 | 2.337 | 2.320 | 2.330 |
| 310 | 2.302 | 2.284 | 2.294 |
| 222 | 1.778 | 1.963 | 1.971 |
| 312 | 1.924 | 1.910 | 1.918 |
| 213 | 1.873 | 1.860 | 1.868 |

Pyridine adsorption was determined in the following way.

A granulated hydroxyapatite 1 to 10 $\mu$m in particle diameter was lightly compacted by a pressure compactor. The compact was ground in an agate mortar to a finer size of 30 to 100 meshes. Of the ground apatite, 0.075 g was exactly weighed and filled into a tubular sample tube, and dried in a nitrogen atmosphere at 100° C. Meanwhile, a bubbler containing pyridine was immersed in a water bath kept at a constant temperature of 15.5° C., and bubbling with nitrogen was carried out to allow the hydroxy-apatite filled in the reactor to adsorb the pyridine at 100° C. for 15 minutes. Thereafter, the temperature was gradually increased up to 200° C. in a nitrogen stream, and the temperature was maintained to cause desorption of the physically adsorbed content. By gas chromatography of the hydrogen ion detection type, it was confirmed that no more desorption of pyridine was detectable. Next, the temperature was increased at a rate of 5° C./minute from 200° C. up to 950° C. The quantity of pyridine desorbed thereby was determined by the gas chromatography. This quantity of pyridine eliminated was measured as the pyridine adsorption.

EXAMPLE 2

The same material as used in Example 1 was employed to prepare granules under the same reaction conditions. The granular product was dried at 100° C. and then fired at 400° C. for 3 hours. The lattice spacings of the fired granules as measured by X-ray diffraction were as shown in Table 1.

The property values of the product were as follows:
(1) Unit lattice constants:
a=9.51 Å
c=6.96 Å
(2) Pyridine adsorption=0.0092 mmol/g
(3) Ca/P ratio=1.67

EXAMPLE 3

The same material and the same reaction conditions as used in Example 1 were employed to prepare granules. The product was dried at 100° C. and fired at 700° C. for 3 hours. The lattice spacings of the granules as measured by X-ray diffraction are given in Table 1.

The property values were as follows:
(1) Unit lattice constants:
a=9.55 Å
c=6.99 Å
(2) Pyridine adsorption=0.0038 mmol/g
(3) Ca/P ratio=1.67

REFERENCE EXAMPLE

Figure 2:
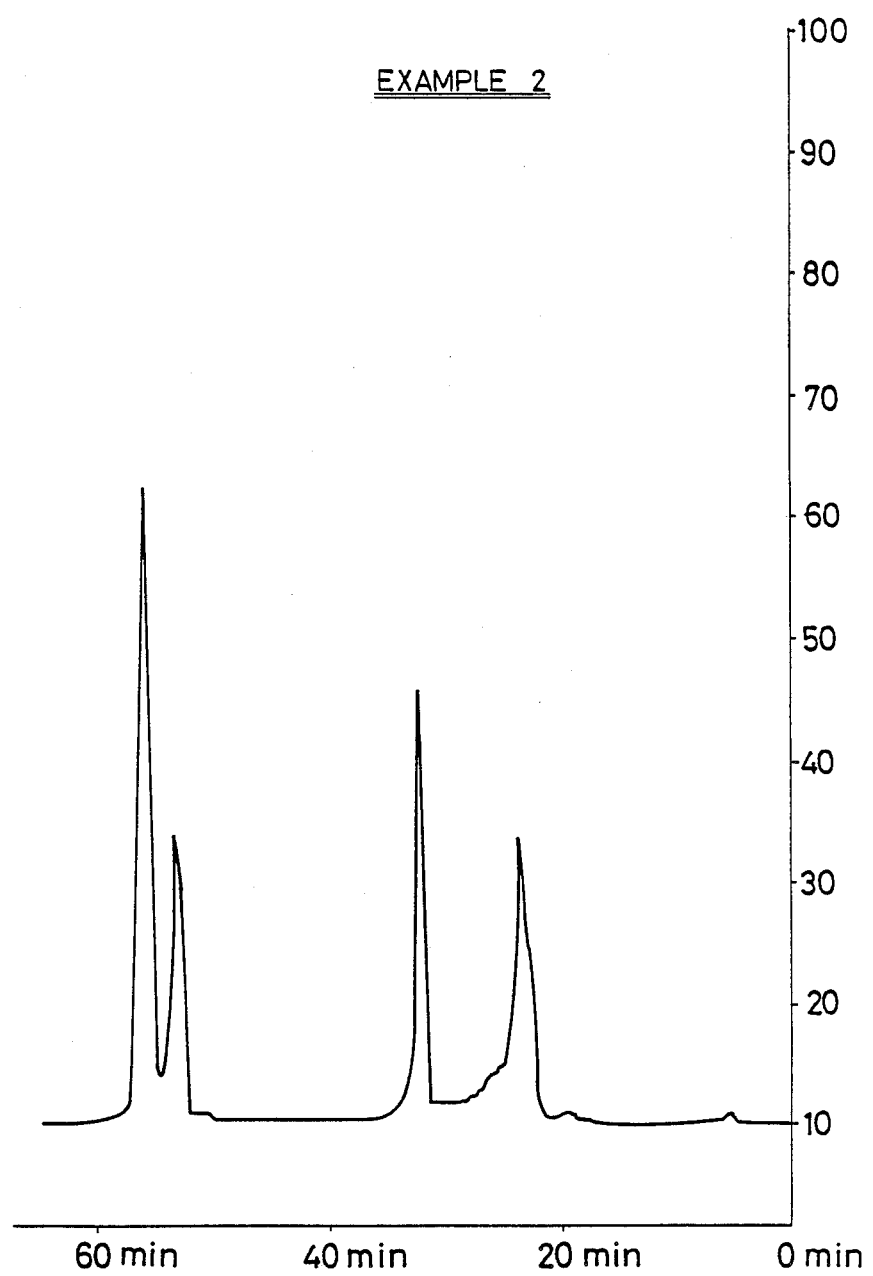
Figure 3:
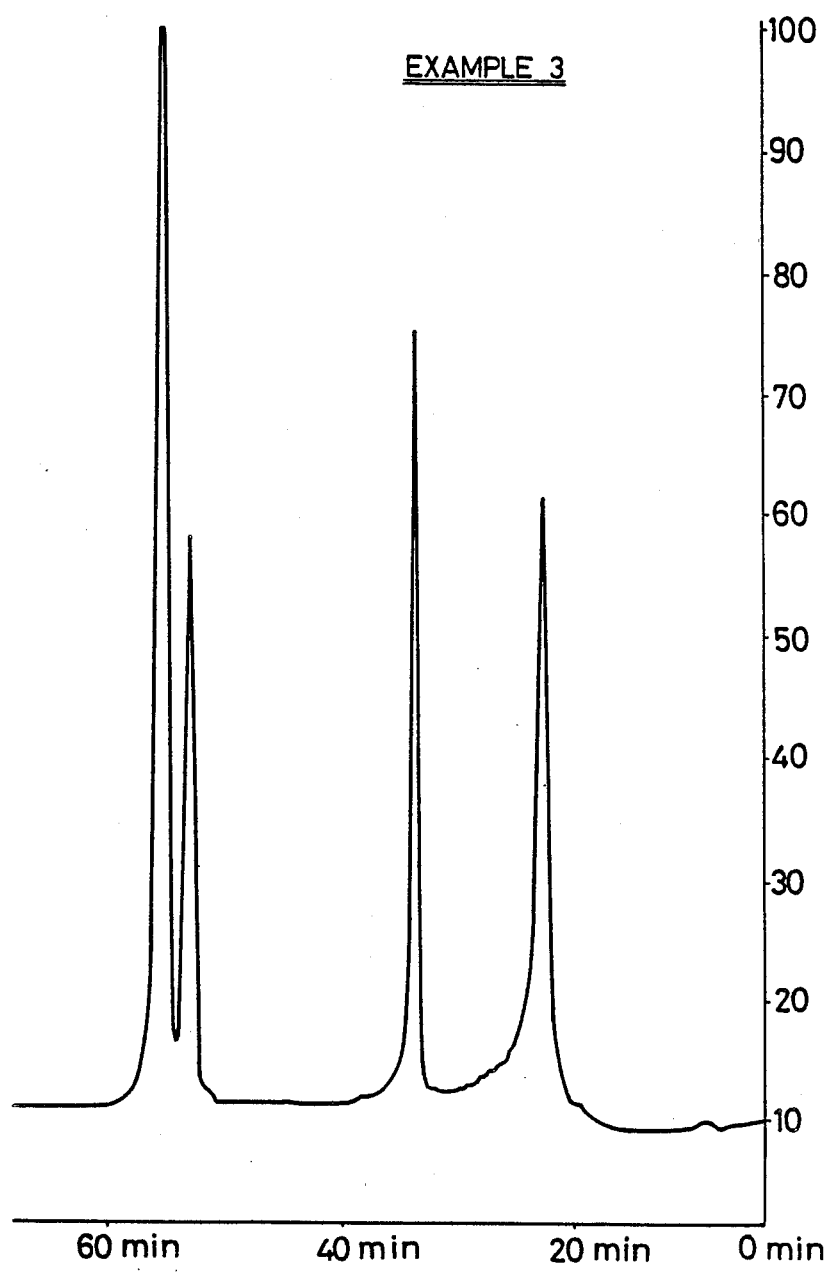

The hydroxyapatites obtained in Examples 1 to 3 were used in separating samples of a mixture of cytochrome C, lysozyme, and bovine serum albumin (BSA). The conditions employed for the chromatograpic separating operations were as follows:

Liquid chromatograph:
Model "LC244" mfd. by Waters Co.
Solvent (gradient solution):
Aqueous solution of sodium phosphate (pH 6.8) 0.01–0.3 mol/hr gradient
Flow rate:
0.8 ml/min
Sample quantity:
100 μl each (50 μl where the hydroxyapatite of Example 2 was used)
Detector:
Model "UVDEC-100-III"
mfd. by Japan Spectroscopic Co.;
Detection wavelength=280 nm
Chromatogram record:
Recording chart speed=2.5 mm/min The results are graphically shown in FIGS. 1 to 3. It can be clearly seen that the hydroxyapatites prepared in accordance with the invention have by far the greater separation capabilities than the known hydroxyapatites.

Numbers of theoretical plates were found so as to determine the separation capabilities in the separation of cytochrome C. The results obtained are shown in Table 2. For the purposes of the invention of term "number of theoretical plates" is calculated, on the basis of the resolution time (tR) in chromatography and the half-width of the chromatograph, from the following formula:

N (No. of theoretical plates)=$16(tR/\omega)^2$.

TABLE 2

| | Example | | |
|---|---|---|---|
| | 1 | 2 | 3 |
| Ca/P ratio | | | 1.67 |
| Lattice spacing constant | | | |
| a (Å) | 9.58 | 9.51 | 9.55 |
| c (Å) | 7.01 | 6.96 | 6.99 |
| Pyridine adsorption (mmol/g) | 0.0056 | 0.0092 | 0.0038 |
| No. of theoretical plates for separation of cytochrome C | (14,000 20,000) | 13,000 | 11,000 |

The hydroxyapatite according to the present invention has unique shape, size, and crystal properties and is extremely useful as a column packing material for chromatographic separation of biopolymers, for example, proteins, realizing marked improvements in the separability of chromatography.

What is claimed is:

1. A calcium-phosphate type hydroxyapatite for chromatographic separation in the form of spherulites having a mean particle diameter of 0.5 to 50 μm, each said spherulite being formed by aggregating mainly acicular crystallites, said crystallites characterized by a hexagonal unit lattice having unit lattice constants of 9.58+0.08A for the a axis and 7.00+0.05A for the c axis.

2. A calcium-phosphate type hydroxapatite for chromatographic separation according to claim 1 in which the mean particle diameter of the spherulites is 1 to 10 μm.

3. A calcium-phosphate type hydroxyapatite for chromatographic separation according to claim 2 in which phyridine adsorption is in the range of 0.003 to 0.01 mmol/g.

4. A calcium-phosphate type hydroxyapatite according to claim 1 or 2 in which the Ca/P ratio of the hydroxyapatite is in the range of 1.50 to 1.90.

5. A calcium-phosphate type hydroxyapatite according to claim 3 in which the Ca/P ratio of the hydroxyapatite is in the range of 1.50 to 1.90.

6. A calcium-phosphate type hydroxyapatite for chromatographic separation comprising spherulites having a mean particle diameter of 0.5 to 50 μm, said spherulites each comprising an aggregate of acicular crystallites of hexagonal unit lattice having unit lattice constants of 9.58±0.08 Å for the a axis and 7.00±0.05 Å for the c axis, the pyridine adsorption of said calcium-phosphate hydroxyapatite being in the range of 0.003 to 0.01 mmol/g.

* * * * *

UNITED STATES PATENT AND TRADEMARK OFFICE
CERTIFICATE OF CORRECTION

PATENT NO. : 4,781,904
DATED : November 1, 1988
INVENTOR(S) : Nobuaki Tagaya, et al.

It is certified that error appears in the above—identified patent and that said Letters Patent is hereby corrected as shown below:

Column 8, line 40, change "9.58 + 0.08A for the a axis and 7.00 + 0.05A" to --9.58 ± 0.08Å for the a axis and 7.00 ± 0.06Å--.

Signed and Sealed this

Nineteenth Day of December, 1989

Attest:

JEFFREY M. SAMUELS

*Attesting Officer*     Acting Commissioner of Patents and Trademarks